United States Patent
Bahrami et al.

(10) Patent No.: US 10,572,370 B2
(45) Date of Patent: Feb. 25, 2020

(54) TEST-ASSISTED APPLICATION PROGRAMMING INTERFACE (API) LEARNING

(71) Applicant: FUJITSU LIMITED, Kawasaki-shi, Kanagawa (JP)

(72) Inventors: Mehdi Bahrami, Santa Clara, CA (US); Junhee Park, San Jose, CA (US); Wei-Peng Chen, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 46 days.

(21) Appl. No.: 15/715,658

(22) Filed: Sep. 26, 2017

(65) Prior Publication Data
US 2019/0095318 A1    Mar. 28, 2019

(51) Int. Cl.
G06F 11/36 (2006.01)
G06F 9/46 (2006.01)
H04L 29/08 (2006.01)
G06F 9/445 (2018.01)
G06N 20/00 (2019.01)

(52) U.S. Cl.
CPC ...... *G06F 11/3676* (2013.01); *G06F 9/44584* (2013.01); *G06F 9/463* (2013.01); *G06F 11/3684* (2013.01); *G06N 20/00* (2019.01); *H04L 67/34* (2013.01); *G06F 11/3664* (2013.01)

(58) Field of Classification Search
USPC .................................................. 717/106, 124
See application file for complete search history.

(56) References Cited

U.S. PATENT DOCUMENTS 6,591,417 B1 * 7/2003 Strysniewicz ............ G06F 8/65
717/168
8,656,365 B2 * 2/2014 Rama ..................... G06Q 10/06
717/126

(Continued)

OTHER PUBLICATIONS

Lee et al. "Semantically Enabled Data Mashups using Ontology Learning Method for Web APIs", Jan. 2012, 2012 Computing, Communications and Applications Conference. (Year: 2012).*

(Continued)

*Primary Examiner* — Jason D Mitchell
(74) *Attorney, Agent, or Firm* — Maschoff Brennan

(57) ABSTRACT

A method of test-assisted application programming interface (API) learning includes generating a machine-readable API specification (API spec). The API spec is based on application of machine learning and regular expression processes to an API documentation. The method includes comparing the API spec to other API specifications. Based on the comparison, the method includes identifying a set of similar API specifications. The method includes generating API test inputs based on the set of similar API specifications and the API spec. The method includes calling a native API system using a first API test input of the API test inputs. The method includes receiving a response indicative of whether the first API test input successfully interacts with the native API system. Based on the response, the method includes generating a feedback indicative of an alteration to the API test inputs or to the machine learning or the regular expression processes.

20 Claims, 11 Drawing Sheets

(56) References Cited

U.S. PATENT DOCUMENTS

| | | | |
|---|---|---|---|
| 8,805,877 B2* | 8/2014 | Krishmamurthy | G06F 17/30985 707/766 |
| 8,949,792 B2* | 2/2015 | Paterson | G06F 11/3664 714/38.1 |
| 9,396,092 B1 | 7/2016 | Kuo et al. | |
| 9,418,375 B1* | 8/2016 | Cunico | G06F 16/36 |
| 10,133,650 B1* | 11/2018 | Park | G06F 11/3684 |
| 2006/0190771 A1* | 8/2006 | Hefner | G06F 11/3684 714/38.14 |
| 2010/0312782 A1* | 12/2010 | Li | G06F 17/30991 707/769 |
| 2015/0324349 A1* | 11/2015 | Weiss | G06F 17/30654 704/9 |
| 2017/0098013 A1* | 4/2017 | Shirwadkar | G06F 17/30731 |
| 2017/0242863 A1* | 8/2017 | Dorairajan | G06F 17/241 |
| 2017/0337052 A1* | 11/2017 | Elkabany | G06F 8/71 |
| 2018/0165135 A1* | 6/2018 | Bahrami | G06F 9/541 |
| 2018/0196643 A1* | 7/2018 | Dolby | G06F 8/36 |
| 2018/0288129 A1* | 10/2018 | Joshi | H04L 43/08 |
| 2018/0357154 A1* | 12/2018 | Dolby | G06F 11/3684 |

OTHER PUBLICATIONS

Yunyao Li, et al. (Oct. 2008). "Regular Expression Learning for Information Extraction". Proceedings of the 2008 Conference on Empirical Methods in Natural Language Processing. p. 21-30.
U.S. Appl. No. 15/374,798, filed Dec. 9, 2016.

* cited by examiner

TEST-ASSISTED APPLICATION PROGRAMMING INTERFACE (API) LEARNING

FIELD

The embodiments discussed herein are related to test-assisted application programming interface (API) learning.

BACKGROUND

Software applications may be built using one or more application programming interfaces (API or APIs). An API is a set of routines, protocols, and tools that specify how software components interact. APIs are also used when programming graphical user interface (GUI) components. An API may expose at least some functions and/or data of a software application that enables other applications to use resources of the API without concern for implementation of the functions or data.

The subject matter claimed herein is not limited to embodiments that solve any disadvantages or that operate only in environments such as those described. Rather, this background is only provided to illustrate one example technology area where some embodiments described herein may be practiced.

SUMMARY

According to an aspect of an embodiment, a method of test-assisted application programming interface (API) learning may include generating a machine-readable API specification. The machine-readable API specification may be based on application of a machine learning process and a regular expression process to an API documentation. The method may include comparing the generated machine-readable API specification to other machine-readable API specifications. Based on a comparison between the generated machine-readable API specification and the other machine-readable API specifications, the method may include identifying a set of similar API specifications. The method may include generating API test inputs that include API endpoints based on the set of similar API specifications and the generated machine-readable API specification. The method may include calling a native API system using a first API test input of the generated API test inputs. The method may include receiving a response from the native API system. The response may be indicative of whether the first API test input successfully interacts with the native API system. Based on the response from the native API system, the method may include generating a feedback that is indicative of an alteration to one or more or a combination of the machine learning process, the regular expression process, and the API test inputs.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Embodiments described in the present disclosure relate to test-assisted application programming interface (API) learning and systems configured for test-assisted API learning. API learning is used to extract information from API documentation using a computing system and to develop a machine-readable API specification. However, machine-readable API specifications may be subject to errors. The errors in the machine-readable API specifications may limit effectiveness of the machine-readable API specification. For instance, machine-readable API specifications may extract correct information (e.g., the information intended to be extracted using the API) as well as incorrect information (e.g., additional information, erroneous information, no information, or error messages). This technical problem may be overcome by test-assisted API learning. For instance, in embodiments described in the present disclosure, a machine-readable API specification may be generated based on a machine learning process and/or a regular expression process. The machine learning process and the regular expression process develops a regular expressions based on API documentation. The machine learning process may then train and refine the regular expressions to develop a machine-readable API specification. The machine learning process may use both positive case sets and negative case sets. The machine-readable API specification is then evaluated. For instance, the machine-readable API specification may be used to identify other machine-readable API specifications that match or are similar to the machine-readable API specification. API test inputs may be generated based on the machine-readable API specification and the identified other machine-readable API specifications. The API test inputs may be tested by calling a native API system using the machine-readable API specification along with one or more additional API test inputs. The native API system may provide a response that is indicative of whether the API test inputs successfully interact with the native API system. Feedback may be generated based on the response. The feedback is then processed, which improves the machine-readable API specification.

These and other embodiments are described with reference to the appended Figures in which like item number indicates like function and structure unless described otherwise.

Figure 1:
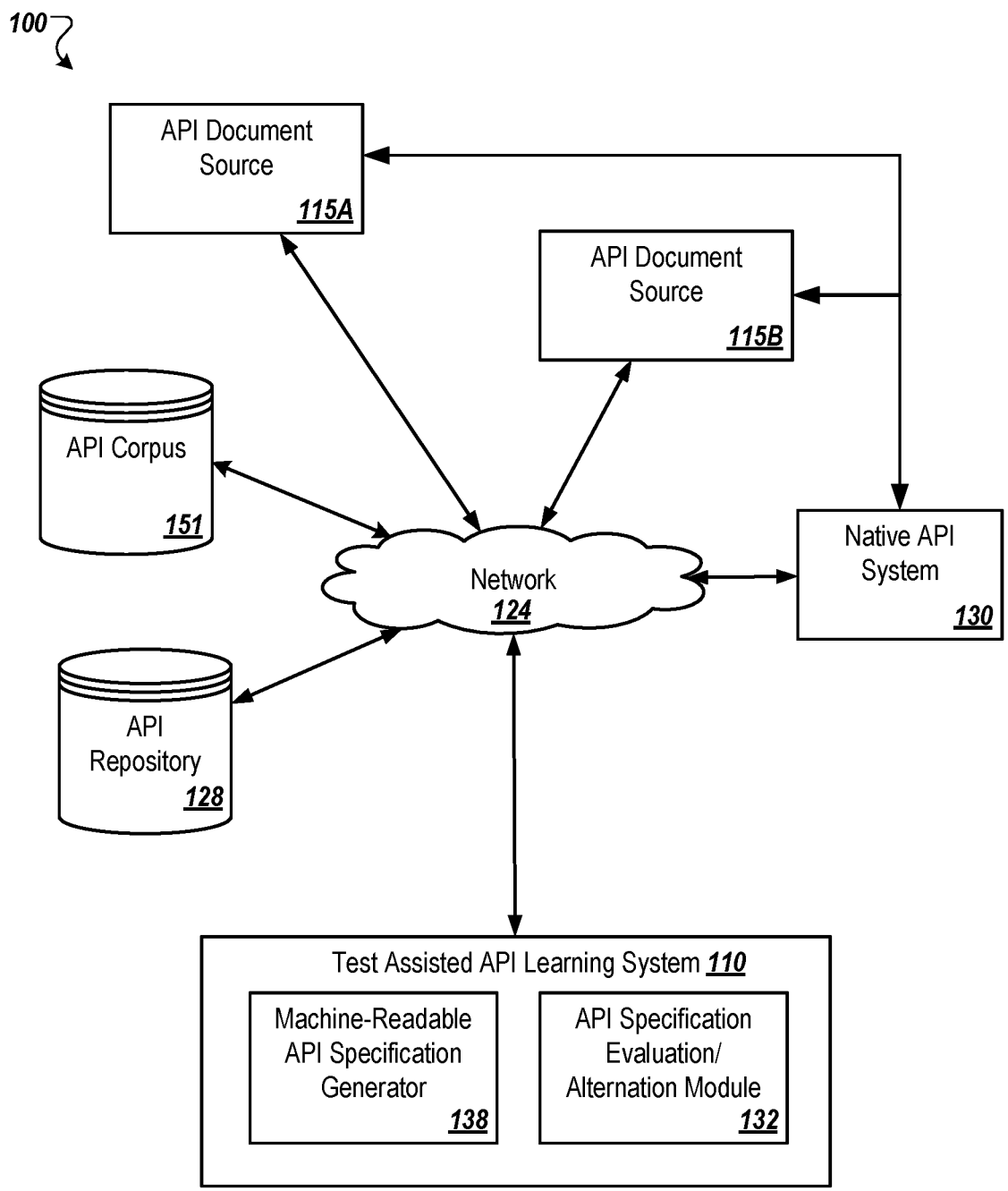
FIG. 1 illustrates a block diagram of an example operating environment of an application programming interface (API) learning system.

FIG. 1 illustrates a block diagram of an example operating environment 100 arranged in accordance with at least one embodiment described herein. The operating environment that may include a test assisted API learning system 110 (hereinafter, "API learning system 110") that is configured to implement test-assisted API learning. The test-assisted API learning enables extraction of information from API documentation that may be available from API document sources 115A and 115B (general, API document source 115 or API document sources 115). The test-assisted API learning may result in a machine-readable API specification, which may enable one or more applications to interact with APIs and/or a native API system 130 without or with minimal manual configuration.

The test-assisted API learning may address a technical problem existent in computer and computer-related technical fields. For instance, API documentations may be developed by an API publisher/provider. The API documentations may be written in natural language (e.g., English in sentences, etc.). Accordingly, different APIs may have heterogeneous API documentation. The heterogeneous API documentation requires a dynamic model to extract information from a source (e.g., the API document sources 115). In addition, to extract information, each unique API description may be required. The API learning system 110 addresses this technical problem by enabling an extraction of information from API documentation. A result of the API learning system 110 may include a machine-readable API specification, which may be implemented to extract information from the source without manual interaction.

The API learning system 110 of FIG. 1 may further provide a technical improvement to systems and methods that implement API learning that do not involve one or more processes described in the present disclosure. For example, the API learning system 110 of FIG. 1 may provide an improvement to the systems and methods described in U.S. application Ser. No. 15/374,798 filed Dec. 9, 2016, which is incorporated herein by reference in its entirety.

Some technical improvements provided by the API learning system 110 may include implementation of a machine learning process. The machine learning process may be implemented to learn about APIs and/or map information extraction from API documentation to API attributes. The machine learning process may develop a machine-readable API specification based on positive test cases and negative test cases. Use of the positive test cases and negative test cases train a resultant machine-readable API specification and improve the machine-readable API specification as described elsewhere in the present disclosure. Additionally, the API learning system 110 may evaluate the generated API specification by using the API specification to call the native API system 130. Responses from the native API system 130 may be used generate feedback that is indicative of alterations to the learning process, which may improve the machine-readable API specification.

Embodiments described in the present disclosure are related to an internet-centric technological field. For example, the embodiments described herein relate to information extraction from computing systems using APIs. The computing systems may, in some embodiments, be communicatively connected via a computing network such as a network 124 described below.

The operating environment 100 of FIG. 1 may include the API learning system 110, the API document sources 115, the native API system 130, an API corpus 151, and an API repository 128. The API learning system 110, the API document sources 115, the native API system 130, the API repository, or some combination thereof may communicate information and data via the network 124. Each of the network 124, the API learning system 110, the API document sources 115, the native API system 130, the API corpus 151, and the API repository 128 are briefly described below.

The network 124 may include any communication network configured for communication of signals between any of the components (e.g., 128, 130, 151, 110, and 115) of the operating environment 100. The network 124 may be wired or wireless. The network 124 may have numerous configurations including a star configuration, a token ring configuration, or another suitable configuration. Furthermore, the network 124 may include a local area network (LAN), a wide area network (WAN) (e.g., the Internet), and/or other interconnected data paths across which multiple devices may communicate. In some embodiments, the network 124 may include a peer-to-peer network. The network 124 may also be coupled to or include portions of a telecommunications network that may enable communication of data in a variety of different communication protocols.

In some embodiments, the network 124 includes or is configured to include a BLUETOOTH® communication network, a Z-Wave® communication network, an Insteon® communication network, an EnOcean® communication network, a Wi-Fi communication network, a ZigBee communication network, a HomePlug communication network, a Power-line Communication (PLC) communication network, a message queue telemetry transport (MQTT) communication network, a MQTT-sensor (MQTT-S) communication network, a constrained application protocol (CoAP) communication network, a representative state transfer application protocol interface (REST API) communication network, an extensible messaging and presence protocol (XMPP) communication network, a cellular communications network, any similar communication networks, or any combination thereof for sending and receiving data. The data communicated in the network 124 may include data communicated via short messaging service (SMS), multimedia messaging service (MMS), hypertext transfer protocol (HTTP), direct data connection, wireless application protocol (WAP), e-mail, smart energy profile (SEP), ECHONET Lite, OpenADR, or any other protocol that may be implemented with the API learning system 110, the API document sources 115, the native API system 130, the API corpus 151, and the API repository 128.

The API document sources 115 may include any computer-based source for API documentation. For example, the API document sources 115 may include a server, client computer, repository, etc. The API document sources 115 may store API documents in any electronic format, which may be read or otherwise accessible to the API learning system 110. The API documents stored by the API document sources 115 may include API documents that are machine-readable and/or human readable. The API document sources 115 may include an API information service offered by a first electronic device to another electronic device, communicating with each other via the network 124 (e.g., the World Wide Web).

Additionally, in some embodiments, the API document sources 115 may be representative of a repository from which API documentation may be accessed. For instance, API documentation may be found in an API reference manual or otherwise published by API publisher/provider. In these and other embodiments, the API document sources 115 may include the repository from which the API documentation is accessed.

The API repository 128 and the API corpus 151 may include any memory or data storage. The API repository 128 and the API corpus 151 may include network communication capabilities such that other components in the operating environment 100 may communicate with the API repository 128 and the API corpus 151.

In some embodiments, the API repository 128 may include computer-readable storage media for carrying or having computer-executable instructions or data structures stored thereon. The computer-readable storage media may include any available media that may be accessed by a general-purpose or special-purpose computer, such as a processor (e.g., processor 710 of FIG. 7). For example, the API repository 128 may include computer-readable storage media that may be tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may be included in the API repository 128.

The API repository 128 and API corpus 151 may be configured to store various data. For example, the API repository 128 may store one or more APIs, human readable API specifications from developers, files generated following processing of the API documentation, feedback, responses from the native API system 130, and machine-readable API specifications from various developers among other data described in the present disclosure. The API corpus 151 may store raw API data and may include a set of API document sources (e.g., 115). For instance, the API corpus 151 may store training data (e.g., training data 314), a validation set (e.g., validation set 316), and human-readable API specifications from various developers, among other data described in the present disclosure.

The API documentation might be processed by a regular expression process. The regular expression process may be configured to generate a machine-readable API specification. The regular expressions may be manipulated, after it is accessed, by the API learning system 110.

The native API system 130 may include any computer-based or hardware-based computing system. The native API system 130 may be configured to communicate with the components of the operating environment 100. The native API system 130 may include a system or device with which a particular API is configured to interact. For example, the particular API may be configured to extract specific information from the native API system 130. The particular API may correspond to a generated machine-readable API specification. For example, API documentation may be related to the native API system 130. The API learning system 110 may generate a machine-readable API specification representative of the API documentation. The API learning system 110 may then call the native API system 130 based on the generated machine-readable API specification. Based on a response from the native API system 130, the API learning system 110 may improve the machine-readable API specification.

The API learning system 110 may be configured to implement test-assisted API learning processes in the operating environment 100. The API learning system 110 may include a machine-readable API specification generator 138 (hereinafter, "API generator 138") and an API specification evaluation/alteration module 132 (hereinafter, "evaluation module 132").

The API generator 138 and the evaluation module 132 may be implemented using hardware including a processor, a microprocessor (e.g., to perform or control performance of one or more operations), a field-programmable gate array (FPGA), or an application-specific integrated circuit (ASIC). In some other instances, the API generator 138 and the evaluation module 132 may be implemented using a combination of hardware and software. Implementation in software may include rapid activation and deactivation of one or more transistors or transistor elements such as may be included in hardware of a computing system (e.g., the API learning system 110). Additionally, software defined instructions may operate on information within transistor elements. Implementation of software instructions may at least temporarily reconfigure electronic pathways and transform computing hardware.

The API generator 138 may be configured to generate a machine-readable API specification. The API generator 138 may be configured to generate the machine-readable API specification based on application of a machine learning process and a regular expression process to API documentation read or otherwise accessed from one or both of the API document sources 115.

The evaluation module 132 may be configured to compare the generated machine-readable API specification to other machine-readable API specification, which may be stored in the API repository 128. Based on a comparison between the generated machine-readable API specification and the other machine-readable API specifications, the evaluation module 132 may identify other machine-readable API specifications from other repositories that are the same or similar to the generated machine-readable API specification. The identified other machine-readable API specifications may be included in a set of similar API specifications. The set of similar API specifications may include API specifications with one or more common or similar API attributes. The evaluation module 132 may then generate API test inputs based on the set of similar API specifications and the generated machine-readable API specification. The evaluation module 132 may call the native API system 130 using the generated API test inputs. Based on a response from the native API system 130, the evaluation module 132 may generate a feedback that indicates whether correct information is extracted from the native API system 130 with the generated API test inputs.

The evaluation module 132 may generate revised API test inputs based on the feedback. The revised API test inputs may include modifications to the API test inputs that reflect the response when a corresponding generated API test input is used to call the native API system 130.

Modifications, additions, or omissions may be made to the operating environment 100 without departing from the scope of the present disclosure. For example, the operating environment 100 may include one or more API document sources 115, one or more API repositories 128, one or more API systems 130, one or more API corpuses 151, one or more API learning system 110, or any combination thereof. Moreover, the separation of various components and servers in the embodiments described herein is not meant to indicate that the separation occurs in all embodiments. For example, the API repository 128 may be integrated with the API learning system 110. Moreover, it may be understood with the benefit of this disclosure that the described components and servers may generally be integrated together in a single component or server or separated into multiple components or servers.

Figure 2:
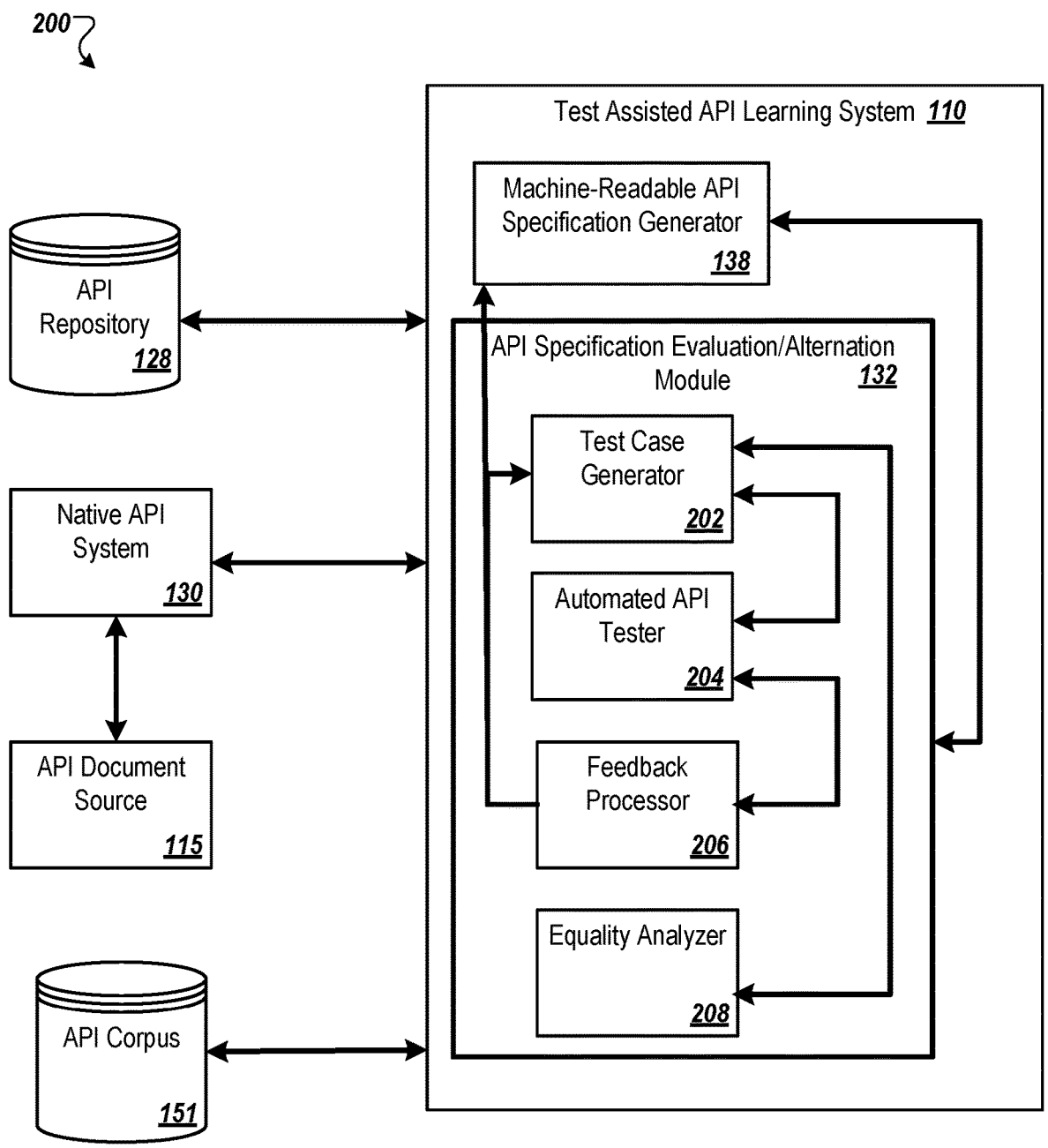
FIG. 2 illustrates an example test-assisted API learning process that may be implemented in the operating environment of FIG. 1.

FIG. 2 illustrates an example test-assisted API learning process 200 that may be implemented in the operating environment 100 of FIG. 1. The test-assisted API learning process 200 may be performed by the API learning system 110 described with reference to FIG. 1. Additionally, the test-assisted API learning process 200 may involve the API repository 128, the API corpus 151, and the native API system 130 described in FIG. 1. Although not depicted in FIG. 2, communication described in the test-assisted API learning process 200 may be via a network (e.g., the network 124).

The test-assisted API learning process 200 may include the API generator 138 introduced with reference to FIG. 1. The API generator 138 may be configured to receive or otherwise access an API documentation. The API generator 138 may be configured for generation of a machine-readable API specification based on application of a machine learning process and/or a regular expression process to the API documentation.

The machine learning process and/or the regular expression process may be performed to formulate a final regular expression. The final regular expression may be configured to extract more correct information and reject more incorrect information. The machine-readable API specification may be based on the final regular expression.

The machine learning process and the regular expression process may be implemented to perform an operation that cannot or cannot be readily performed by other systems that apply API learning without machine learning techniques.

For instance, original content of an example API documentation may include one or more portions of languages, which may include sentences or paragraphs in English, Japanese, or other another language. A set of regular expressions rules may be developed to extract information based on the original content. For example, to generate a machine-readable format of the languages, a final regular expression may be generated that represents the original content. The final regular expression (which may be a basis of a machine-readable API specification or another API specification) may result in an increase in information extracted beyond that explicitly included in the original content. As the regular expressions develop, the regular expression may be expanded to extract additional correct information. However, this expanded regular expression may result in incorrect extractions. Accordingly, the machine learning process implemented by the API generator 138 may include two steps that may be performed multiple times. In a first step, the regular expression is expanded. Subsequently, the expanded regular expression is reduced, which decreases an amount of incorrectly extracted information.

In some embodiments, the API generator 138 may base the expansion and reduction of the regular expressions based on a harmonic mean of a precision and a sensitivity score, which is referred to as an "F1 score." For example, the API generator 138 may expand the regular expressions to accept more sample cases until there is an increase in the F1 score. Subsequently, the API generator 138 may reduce the regular expression to accept only positive cases until a value of the F1 score is not decreased.

The F1 score may be calculated according to F1 expressions:

$$\text{Precision} = \frac{TP}{TP+FP};$$
$$\text{Recall} = \frac{TP}{TP+FN};$$
$$F1 = 2\frac{\text{Precision} * \text{Recall}}{\text{Precision} + \text{Recall}}; \text{ and}$$
$$F1 = \frac{2TP}{2TP+FP+FN}.$$

In the F1 expressions, F1 represents the F1 score. The parameter TP represents a true positive, which may be equivalent with a hit. The parameter TN represents a true negative, which may be equivalent a correct rejection. The parameter FP represents a false positive, which may be equivalent with a false alarm or a Type I error (incorrect rejection of a true null hypothesis). The parameter FN represents a false negative, which may be equivalent with a miss or Type II error (incorrectly retaining a false null hypothesis). The parameters TP, TN, FP, or FN may be determined based on results generated in the evaluation module 132.

In addition, in some embodiments an accuracy of an extraction may be calculated according to an accuracy expression:

$$ACC = \frac{TP+TN}{P+N}.$$

In the accuracy expression, the parameter TP is as described above. The parameter ACC represents a calculated accuracy. The parameter P represents a number of the positive cases in the positive training data. The parameter N represents a number of the negative cases in the negative training data. The parameter TN represents a true negative, which may be equivalent a correct rejection. The parameters TP, TN, FP, or FN may be determined based on results generated in the evaluation module 132.

As described elsewhere in the present disclosure, the F1 score may also be used to evaluate an outcome of the API machine learning process and results of an evaluation of a machine-readable API specification.

Figure 3:
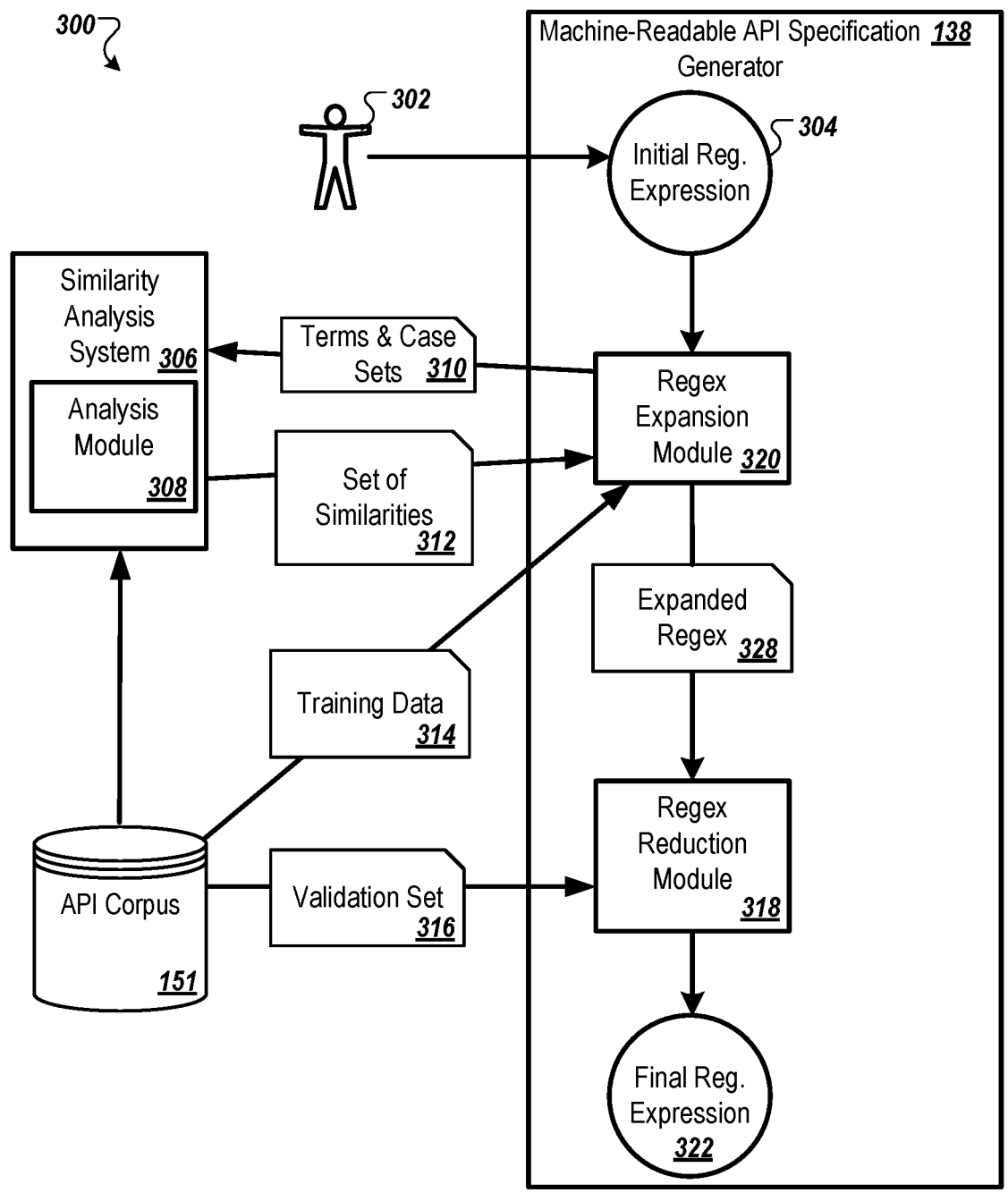
FIG. 3 illustrates an example machine-readable API process and regular expression process that may be implemented in the operating environment of FIG. 1.

Some additional details of an example machine learning process and a regular expression process 300 that may be implemented by the API generator 138 is described with reference to FIG. 3. In FIG. 3, the API generator 138 is depicted with the API corpus 151 and a similarity analysis system 306. In FIG. 3, the term "regular expression" is shortened to "regex."

The similarity analysis system 306 may include a computing system that is communicatively coupled to the API generator 138. Although not depicted in FIG. 3, the API generator 138 may be communicatively coupled to the similarity analysis system 306 via a network such as the network 124 of FIG. 1. Alternatively, in some embodiments, the API generator 138 may be integrated with the similarity analysis system 306.

In the embodiment of the API generator 138 of FIG. 3, a regex expansion module 320 and a regex reduction module 318 are included to implement the machine learning process and the regular expression process 300. The regex expansion module 320 may be configured to receive an initial regular expression 304. The initial regular expression 304 may be developed by a developer 302, who may be an individual or group of individuals in some embodiments. The initial regular expression 304 may be related to a particular task and may be representative of a particular API documentation. The initial regular expression 304 may include multiple terms. An example of the initial regular expression 304 may include:

$R_0^i$:(GET|POST)(((:\n+|[.*]|[\s+]|[$-])+)?)(\s+?) . . . .
([http]?[s]?:?/?/?(?:[.*]|[0-9]|[$-]|[!*]|(?:% [.*] [.*]))+).

The terms in the example initial regular expression 304 may include [.*], [0-9], [$-], [!*], etc.

In addition, the regex expansion module 320 may be configured to receive training data 314 from the API corpus 151. The training data 314 may include a positive case set and a negative case set. The positive case set includes cases in which a successful interaction using a particular API occurred (e.g., correct information is extracted, proper communication of data, etc.). The negative case set includes case in which an unsuccessful interaction using a particular API occurred (e.g., incorrect information is extracted or there is no communication of data). Each of the terms of the initial regular expression 304 may be communicated from the regex expansion module 320 to the similarity analysis system 306. In addition, the positive case set and the negative case set may be communicated to the similarity analysis system 306. In some embodiments, one or more of the terms of the initial regular expression 304, the positive case set, and the negative case set may be communicated to the similarity analysis system 306 as Terms & Case Sets 310.

The similarity analysis system 306 may include an analysis module 308. The analysis module 308 may be configured to receive the terms of the initial regular expression 304, the positive case set, and the negative case set from the regex expansion module 320. The analysis module 308 may be configured to understand terms in the initial regular expression 304, in the positive case set, and in the negative case set. Based on an understanding of the terms, the analysis module 308 may then generate a set of similarities 312. The set of similarities 312 may include similar terms to each of the terms and similar cases to each of the cases in the positive and negative case sets. The analysis module 308 may then communicate the set of similarities 312 to the regex expansion module 320.

In some embodiments, the analysis module 308 may include or may utilize a word embedding tool. The word embedding tool may be configured to map language and terms to vectors of real numbers. The word embedding tool of the analysis module 308 may include any suitable word embedding tool that represents a vector representation of words.

The regex expansion module 320 may be configured to expand the initial regular expression 304 based on the set of similarities 312. For example, the regex expansion module 320 may expand the initial regular expression 304 to accept all possible positive cases. For example, the regex expansion module 320 may expand digits (e.g., [0-9]→[.*]), may expand words (e.g., [a-z, A-Z]→[.*] and term→term|Sim (term)), may expand spaces (e.g., [\b]→[\b]*), may expand repetitions [a]+→[a]*), or some combination thereof.

The regex expansion module 320 may expand the initial regular expression 304 until there is an improvement (e.g., an increase) in the F1 calculation of an expanded regular expression 328. The regex expansion module 320 may communicate the expanded regular expression 328 to the regex reduction module 318.

The regex reduction module 318 may receive the expanded regular expression 328 and a validation set 316 from the API corpus 151. The regex reduction module 318 may be configured to maximize positive acceptance rate of the expanded regular expression 328 and to reduce negative acceptance rate of the expanded regular expression 328. The regex reduction module 318 may base a reduction based on an F1 score. For example, the regex reduction module 318 may be configured to reduce a repetition (e.g., *→+ and [A]→?[A]), to reduce word (e.g., [a-zA-Z]→[a-z]|[A-Z], to reduces digits (e.g., [0-2]→[0]1[1]1[2]→[1]|[2], to remove terms preceded by an 'or' (e.g., A|B|C→A|), or some combination thereof.

The regex reduction module 318 may reduce the expanded regular expression 328 until only positive cases are accepted and/or until the F1 score does not decrease. The regex reduction module 318 may output a final regular expression 322. An example of the final regular expression 322 may include:

(PATCH|POST|GET|DELETE|PUT|CONNECT|HEAD-
|OPTIONS|TRACE| . . . .
. . . Resource URL)(((\n+|[?a-zA-Z:+]|[?\s+]|[?$_@.&
( ){ }=:+",~-])+)?)(\s+?)
. . . ([http]?[s]?:?/?/?(?: [a-zA-Z]|[0-9]|[$-_@.&+;{
}?,#~=]|[!*\(\),]|
. . . (?:%[0-9a-fA-F][0-9a-fA-F]))+).

The final regular expression 322 is based on the example initial regular expression 304 provided above.

Referring to FIGS. 2 and 3, the final regular expression 322 of FIG. 3 may be used to generate a machine-readable API specification, which may be communicated from the API generator 138 to the evaluation module 132. The evaluation module 132 may be configured to test whether the machine-readable API specification based on the final regular expression 322. In addition, the evaluation module 132 may be configured to provide additional positive and negative test cases that may improve the final regular expression 322. The evaluation module 132 may be further configured to communicate modifications to the API generator 138, the training data 314, etc. or to implement such modifications to change the final regular expression 322 such that correct information is extracted.

For example, the machine-readable API specification based on the final regular expression 322 may include an original host uniform resource locator (URL), a base path, an endpoint, a parameter, an attribute of the parameter (e.g., parameter type), or some combination thereof. Each of the host URL, the base path, the endpoint, and the parameters are referred to as an attribute. Each of the attributes may include values. For instance, an example of a machine-readable API specification based on the final regular expression 322 may include:

GET https://k5.fujitsu.com/v1/POS/{id}.

In the example machine-readable API specification, "GET" represents an http method. The portion 'k5.fujitsu.com' represents the host URL. The portion 'v1' represents the base path. The portion 'POS' represents the endpoint. The portion 'id' represents the parameter. The { } represents the parameter type. The values of the attributes of the example final regular expression are 'k5.fujitsu.com', 'v1', and 'POS'.

Each part of the final regular expression 322 may be incorrect. For instance, the host URL may have changed at the native API system 130 when the host URL is revised. The evaluation module 132 may be configured to test the response to the machine-readable API specification to determine whether the response to the machine-readable API specification is correct. If the response to the machine-readable API specification is incorrect, the evaluation module 132 is configured to identify which part (e.g., the host URL, the base, etc.) is incorrect and implement modifications, which may generate another correct or more-correct machine-readable API specification.

With reference to FIG. 2, the evaluation module 132 may include an equality analyzer 208, a test case generator 202, an automated API tester 204, and a feedback processor 206. The equality analyzer 208 may be configured to compare the generated machine-readable API specifications (e.g., which can be produced by processing the final regular expression 322 on API document source 115A and 115B) to other machine-readable API specifications (for example, other machine-readable API specifications which exist or have been developed by an API publisher). Based on a comparison between the one machine-readable API specification and the other machine-readable API specifications, the equality analyzer 208 may identify a set of similar API specifications, which may include similar API attributes (e.g., one may be generated by API generator 138 and another may be produced by a third party).

The equality analyzer 208 may be configured to identify the set of similar APIs from the API repository 128. The equality analyzer 208 may determine similarity between API specifications based on similarity between structure of the API specifications, between attributes of the API specifications, and between values of the attributes.

For example, the equality analyzer 208 may receive "GET https://k5.fujitsu.com/v1/POS/{id}." The equality analyzer 208 may then analyze multiple other API specifications from the API repository 128 to identify one or more Fujitsu K5 APIs that may contain identical or newer API information (e.g., attributes, attribute values, etc.). Some additional details of an example embodiment of the equality analyzer 208 are provided with reference to FIG. 4.

The equality analyzer 208 may provide the set of similar API specifications to the test case generator 202. The test case generator 202 may be configured to generate API test inputs. The API test inputs may be based on the set of similar API specifications and the machine-readable API specification (e.g., the outcome of processing a final regular expression 322). The API test inputs may include various API endpoints and/or other API information that is found in the set of similar API specifications. For example, the example of machine-readable API specification may include "GET https://k5.fujitsu.com/v1/POS/{id}" as introduced below. Based on processing API document source 115A and 115B by using the final regular expression and finding a set of similar APIs, the test case generator 202 may generate an example list of API test inputs, which may include the following set of machine-readable API specification endpoints:

Repo$_1$: GET https://k5.fujitsu.com/v1/LIST/{id};
Repo$_2$: GET https://k5.fujitsu.com/v1/POS/{id};
Repo$_2$: GET https://k5.fujitsu.com/v1/LIST/{id};
Repo$_2$: GET https://k5.fujitsu.com/v3/POS/{id};
Repo$_3$: GET https://k5.fujitsu.com/v3/LIST/{id};
Repo$_3$: GET https://fujitsu.com/v1/POS/{id};
Repo$_4$: GET https://fujitsu.com/v1/LIST/{id}; and
Repo$_4$: GET https://fujitsu.com/v1/POS/{id}.

The example list of API test inputs may be collected from four different API repositories "Repo$_1$," "Repo$_2$," "Repo$_3$," and "Repo$_4$" that may be similar or identical to the generated machine-readable API specification. The API test inputs may vary one or more attributes or values of the attributes. For instance, the host URL may be changed from "K5.fujitsu.com" to "fujitsu.com."

The test case generator 202 may be further configured to generate revised API test inputs. The revised API test inputs may be similar to the API test inputs above, but may be based on at least partially on feedback received following testing of the API test inputs. For instance, the API test inputs may be tested (as described below). Based on the test, feedback may be generated, which may indicate that the revised API test inputs may be generated by the test case generator 202. The revised API test inputs may include at least one modification to the API test inputs and may reflects a response when a corresponding generated API test input is used to call the native API system 130. For example, revised API test inputs may modify the final two API test inputs from the fourth repository to be:

Repo$_4$: GET https://k5.fujitsu.com/v1/POS/{id}; and
Repo$_4$: GET https://k5.fujitsu.com/v1/LIST/{id}.

Additionally, the test case generator 202 may modify any attribute of the API test input, the HTTP method, the native API system, the API repository from which the other APIs are compared, etc.

The test case generator 202 may communicate the API test inputs and/or the revised API test inputs to the automated API tester 204. The automated API tester 204 may be configured to call the native API system 130 using the API test inputs and/or the revised API test inputs. The native API system 130 may provide a response. The response may include information extracted and/or an HTTP code. The automated API tester 204 may communicate the response to the feedback processor 206.

The feedback processor 206 may be configured to generate feedback based on a response to a test of at least one of the API test inputs. The response may be indicative of whether the first API test input successfully interacts with the native API system 130. Examples of successful interaction may include extraction of correct information (e.g., a proper GET operation), correct information being input into an operation (e.g., a proper FETCH operation), correct information being assigned to a variable (e.g., a proper LOAD operation) etc. An unsuccessful interaction may include extraction, assignment, input, etc. of incorrect information, to incorrect processes, or no operations being performed (e.g., an error).

The feedback generated from the response may be indicative of an alternation that may be implemented to improve the machine-readable API specification, the regular expression process, the machine learning process, the API test inputs, or some combination thereof. For example, the feedback processor 206 may evaluate the response based on standard response codes (e.g., standard HTTP codes) and on whether the response includes positive cases or negative cases. Based on the evaluated response, the feedback processor 206 may be configured to request one or more or a combination of the revised API test input, a change to training data (e.g., 314), and a modification to the machine-readable API specification.

In detail, the feedback processor 206 may generate the feedback based on a returned HTTP code. For example, a 301 HTTP code indicates the server of the native API system 130 is moved permanently. Based on the HTTP code 301, the feedback processor 206 may request a modification to the API Generator 138 to produce a new machine-readable API from API document source 115 that are related to the native API system 130. In contrast, based on a HTTP code of 200, which indicates the extraction is correct, the feedback processor 206 may add a positive case to training data for processing of subsequent API documentation from the API document sources 115. The feedback processor 206 may also generate specific feedback for 203 HTTP code, which indicates a non-authoritative information, for 206 HTTP code, which indicates a partial content, 226 HTTP code, which indicates IM used, etc.

In addition, the feedback processor 206 may generate the feedback based on whether the API test input is a positive case or a negative case. For example, the machine-readable API specification may include:
GET api.fujitsu.com/v1/getScannerID.
In this example, some potential API test inputs may include:
GET api.fujitsu.com/v2/getScannerID;
GET api.fujitsu.com/v1/getScannerID;
GET api.fujitsu.com/v1/getScannerCode; and
GET api.fujitsu.com/v1/getScannerID.
Some subset of the API test inputs may be tested by the automated API tester 204.

The automated API tester 204 may test "GET api.fujitsu.com/v2/getScannerID" and "GET api.fujitsu.com/v1/getScannerID." If the "GET api.fujitsu.com/v1/getScannerID" returns negative case and the "GETapi.fujitsu.com/v2/getScannerID" returns a positive case, the feedback processor 206 may determine that the base has been updated (e.g., v2 instead of v1). Additionally, the automated API tester 204 may test "GET api.fujitsu.com/v1/getScannerID" and "GET api.fujitsu.com/v1/getScannerCode." If the "GET api.fujitsu.com/v1/getScannerID" returns a negative case and the "GET api.fujitsu.com/v1/getScannerCode" returns a positive case, feedback processor 206 may determine that that the endpoint (URI) has been updated. Additionally still, the automated API tester 204 may test "GET api.fujitsu.com/v1/getScannerID" with the data type of integer for "getScannerID." If the "GET api.fujitsu.com/v1/getScannerID" with the data type of integer returns "data type modification for getScannerID as String," feedback processor 206 may determine that that the data type has been updated.

The feedback generated by the feedback processor 206 may include a suggested change. For instance, the response may be indicative of a previous endpoint. Thus, the feedback processor 206 may provide the feedback with a suggested endpoint. Similarly, the response may be indicative of a previous parameter. Thus, the feedback processor 206 may provide the feedback with a suggested parameter. Similarly still, the response may be indicative of a previous attribute. Thus, the feedback processor 206 may provide the feedback with a suggested attributes.

In addition, the feedback processor 206 may be configured to determine one or different sources to test the API test inputs and/or may use a heuristic method to generate new methods, endpoints, parameter, attributes or some combination thereof. The different sources and the new methods, endpoints, etc. may be provided to the test case generator 202 and/or the API generator 138. Furthermore, testing of the API test inputs may issue multiple positive and negative test cases. The positive and negative test cases may be communicated to the API generator 138 for use in the machine learning process. Some additional details of the feedback communicated to the test case generator 202 and/or the API generator 138 are provided with reference to FIGS. 5 and 6.

The feedback processor 206 provides the feedback to the API generator 138 and the test case generator 202. Based on the feedback additional, improved machine-readable API specifications and/or revised API test inputs may be generated. These improved machine-readable API specifications and/or revised API test inputs may be tested, which may produce additional feedback. The additional feedback may then be provided to the API generator 138 and the test case generator 202. Based on the additional feedback, improved machine-readable API specifications and/or revised API test inputs may generated. Accordingly, the API learning system 110 may operate as in a loop until the successful machine-readable API specifications are generated.

The feedback processor 206 may be configured to store the feedback and/or the response for each of the generated API test inputs and for each of the machine-readable API specifications. The stored feedback may include an identification of successful API test inputs and endpoints included therein and/or one or more updates to the machine-readable API specification that resulted in a successful correct information extraction from the native API system 130.

The feedback processor 206 may store the feedback because a revise, final machine-readable API specification may not guarantee successful coverage of successful cases in the previous loops. For instance, previous machine-readable API specification may be successful in a previous loop, but may be later fail to extract correct information. The earlier version of the machine-readable API specification may be used instead of subsequently developed machine-readable API specification. Thus, by storing the previous successful cases, loss of coverage because of change in the regular expression may be limited or eliminated.

Figure 4:
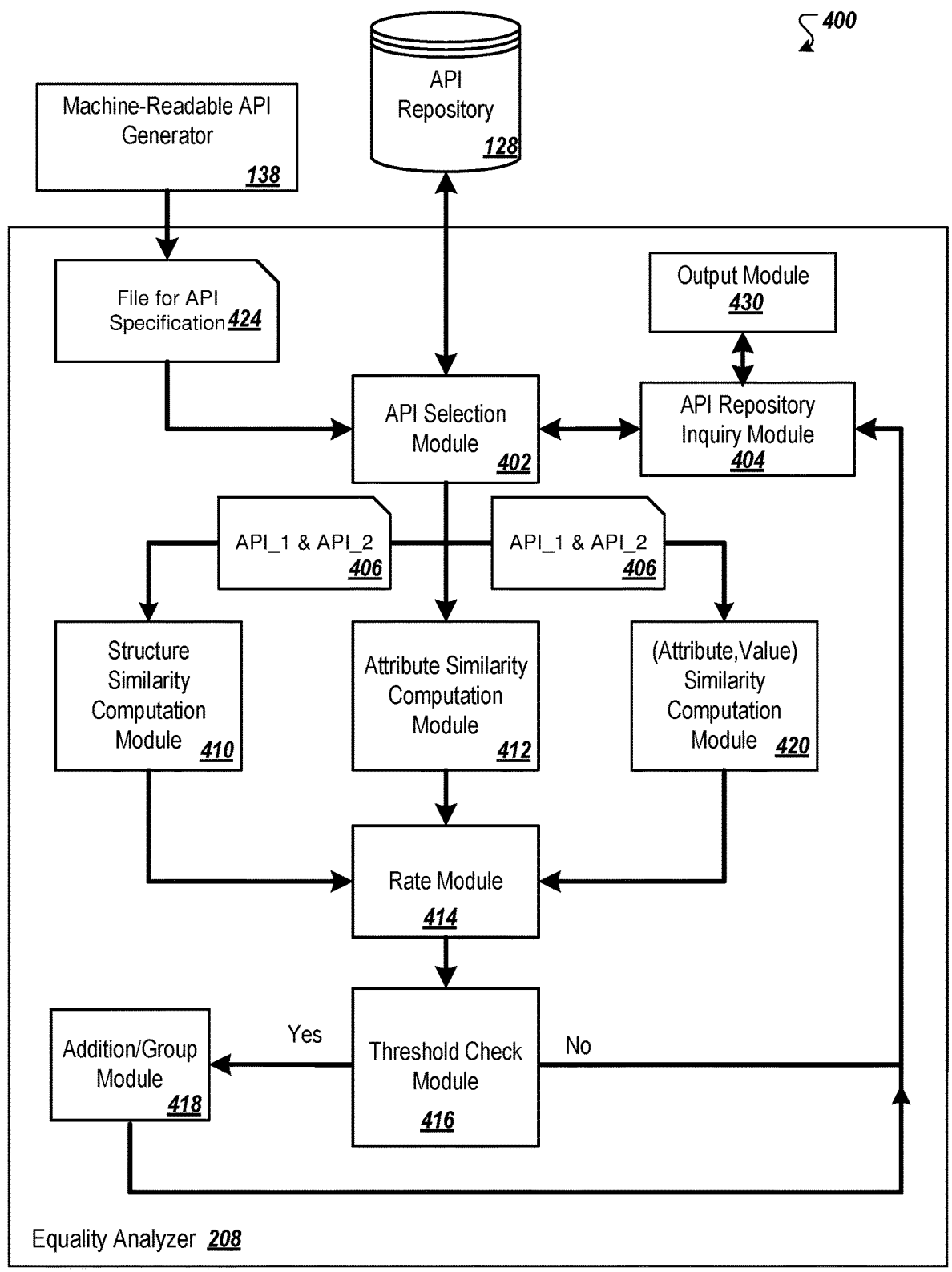
FIG. 4 illustrates an example API equality analysis process that may be implemented in the operating environment of FIG. 1.

FIG. 4 illustrates an example process 400 to identify a set of similar API specifications that are similar to a machine-readable API specification. In FIG. 4, the equality analyzer 208 is depicted with the API repository 128 with multiple other API specifications and the API generator 138 described elsewhere in the present disclosure. The API generator 138 may communicate a file for an API specification (file) 424 to the equality analyzer 208. In some embodiments, the file 424 may be formatted as a JSON file.

An API selection module 402 of the equality analyzer 208 may select a second API specification (API_2), which may include a first of the other machine-readable API specifications of the API repository 128. The API selection module 402 may then communicate the second API specification and a first API specification represented by the file 424 to a structure similarity computation module 410, an attribute similarity computation module 412, and a (attribute, value) similarity computation module 420. In FIG. 4, the first and second API specifications are presented by API_1 & API_2 406. The structure similarity computation module 410 may be configured to compute similarly between structures of the first API specification (e.g., the machine-readable API specification) and the second API specification (e.g., the first of the other machine-readable API specifications). The attribute similarity computation module 412 may be configured to compute similarly between attribute of the first API specification (e.g., the machine-readable API specification) and the second API specification (e.g., the first of the other machine-readable API specifications). The (attribute, value) similarity computation module 420 may be configured to compute similarly between attribute values of the first API specification (e.g., the machine-readable API specification)

and the second API specification (e.g., the first of the other machine-readable API specifications).

A rate module 414 of the equality analyzer 208 may receive computed similarities. The rate module 414 may be configured to calculate a similarity rate of the computed similarities between the structures, the attributes, and the attribute values. The similarity rate may be calculated according to a similarity rate expression:

$$S = \frac{jl\sum S_i + \sum V_l + \sum A_j}{i*j*l}.$$

In the similarity rate expression, $S$ represents the similarity rate. The parameters j, l, i, represent indexing variables. $S_i$ represents the structure similarities. $V_l$ represents the attribute value similarities. $A_j$ represents the attribute similarities.

At a threshold check module 416 of the equality analyzer 208, the similarity rate of the computed similarities may be compared to a threshold for equalities of API specifications. In response to the similarity rate being greater than the threshold, an addition/group module 418 may add the second API to a set of similar APIs. If the similarity rate is less than the threshold, the second API may be disregarded. The equality analyzer 208 may include an API repository inquiry module 404. The API repository inquiry module 404 may determine whether there are APIs in the API repository 128 that have not be analyzed. The API repository inquiry module 404 may communicate a signal to the API selection module 402 that indicates whether there are APIs that have not be analyzed remaining in the API repository 128. In response, to there being API specifications that have not been analyzed, the equality analyzer 208 may repeat the above process with each API specification that has not been analyzed. In response to there not being any remaining API specifications, the API repository inquiry module 404 may communicate a signal to the output module 430 that may be configured to output a set of similar API specifications.

Figure 5:
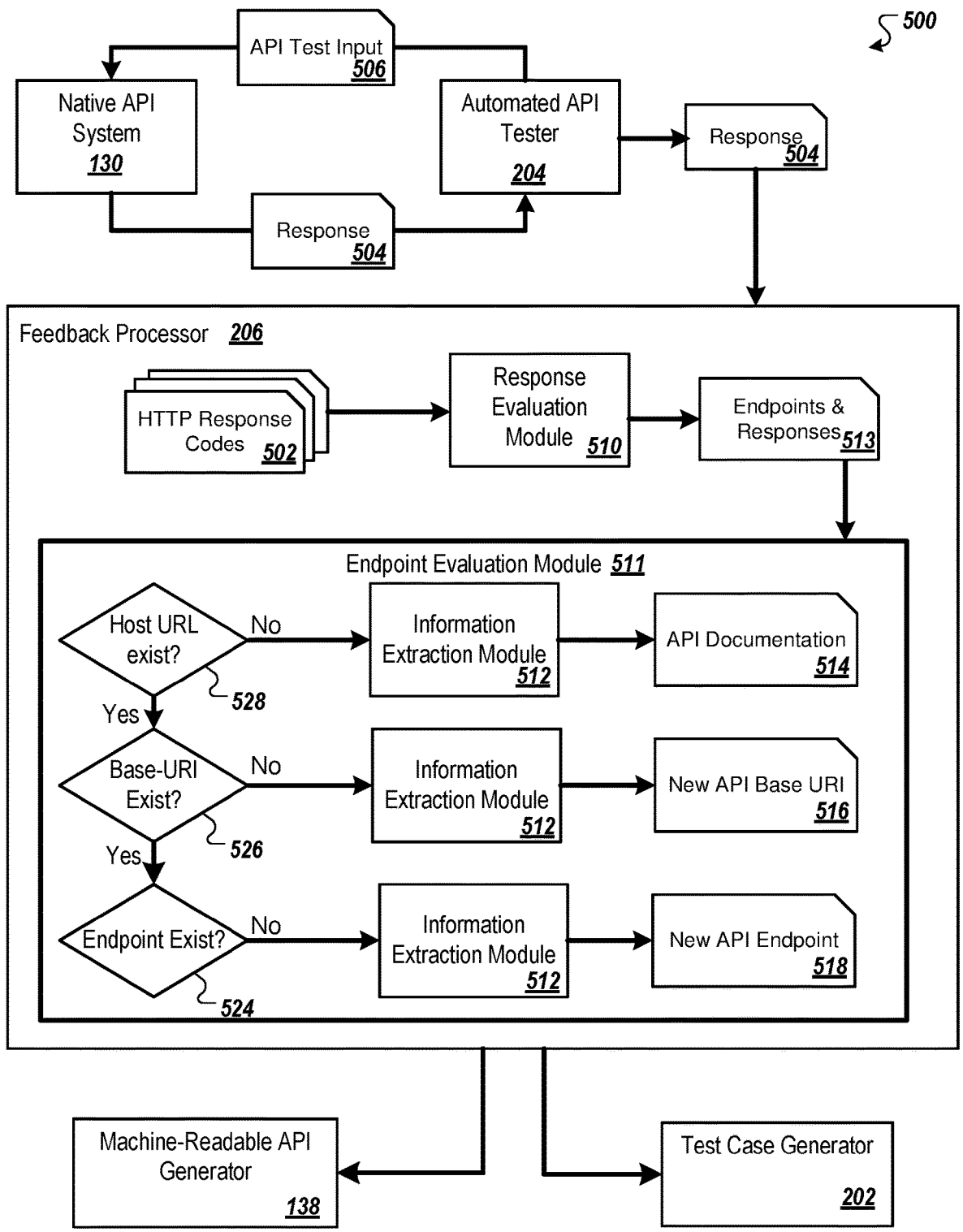
FIG. 5 illustrates an example response evaluation process that may be implemented in the operating environment of FIG. 1.

FIG. 5 illustrates an example response evaluation process 500 that may be implemented in the operating environment 100 of FIG. 1. In FIG. 5, the automated API tester 204 may call the native API system 130 using the API test inputs 506. The native API system 130 may return a response 504 to the automated API tester 204. The automated API tester 204 may communicate the response 504 to the feedback processor 206.

The feedback processor 206 may include a response evaluation module 510 and an endpoint evaluation module 511. The response evaluation module 510 may be configured to receive HTTP response codes 502 and evaluate the response based on the HTTP response codes 502.

The endpoint evaluation module 511 may receive an original endpoint and a response to the original endpoint as well as a revised endpoint and a response to the revised endpoint. The endpoints and responses are represented in FIG. 5 by "endpoints and responses 513." The endpoint evaluation module 511 may perform a series of determinations based on endpoints and responses 513. For example, at a first determination module 528, the endpoint evaluation module 511 may determine whether a host URL of the endpoints and responses 513 exists in the API learning system 110 described above. In response to the host URL not existing in the API learning system 110, the endpoint evaluation module 511 may implement an information extraction (IE) process performed by an IE module 512. Details of an embodiment of the IE module 512 are provided with reference to FIG. 6. The endpoint evaluation module 511 may then find a new API documentation 514, which may include at least one base uniform resource identifier (URI). The API documentation 514 may be communicated to the API generator 138 and/or the test case generator 202.

In response to the host URL existing in the API learning system 110, the endpoint evaluation module 511 may proceed to a second determination module 526. At the second determination module 526, it may be determine whether a base URI of the endpoints and responses 513 exists in the API learning system 110. In response to the base URI not existing in the API learning system 110, the endpoint evaluation module 511 may implement the IE process performed by the IE module 512. The endpoint evaluation module 511 may then find a new API base URI 516, which may include at least one base URI. The new API base URI 516 may be communicated to the API generator 138 and/or the test case generator 202.

In response to the base URI existing in the API learning system 110, the endpoint evaluation module 511 may proceed to a third determination module 524. At the third determination module 524, it may determine whether an endpoint of the endpoints and responses 513 exists in the API learning system 110. In response to the endpoint not existing in the API learning system 110, the endpoint evaluation module 511 may implement the IE process performed by the IE module 512. The endpoint evaluation module 511 may then find a new API endpoint 518. The new API endpoint 518 may be communicated to the API generator 138 and/or the test case generator 202. In response to the endpoint existing in the API learning system 110, the test-assisted API learning process may proceed without specific feedback regarding the endpoints of the endpoints and responses 513.

Figure 6:
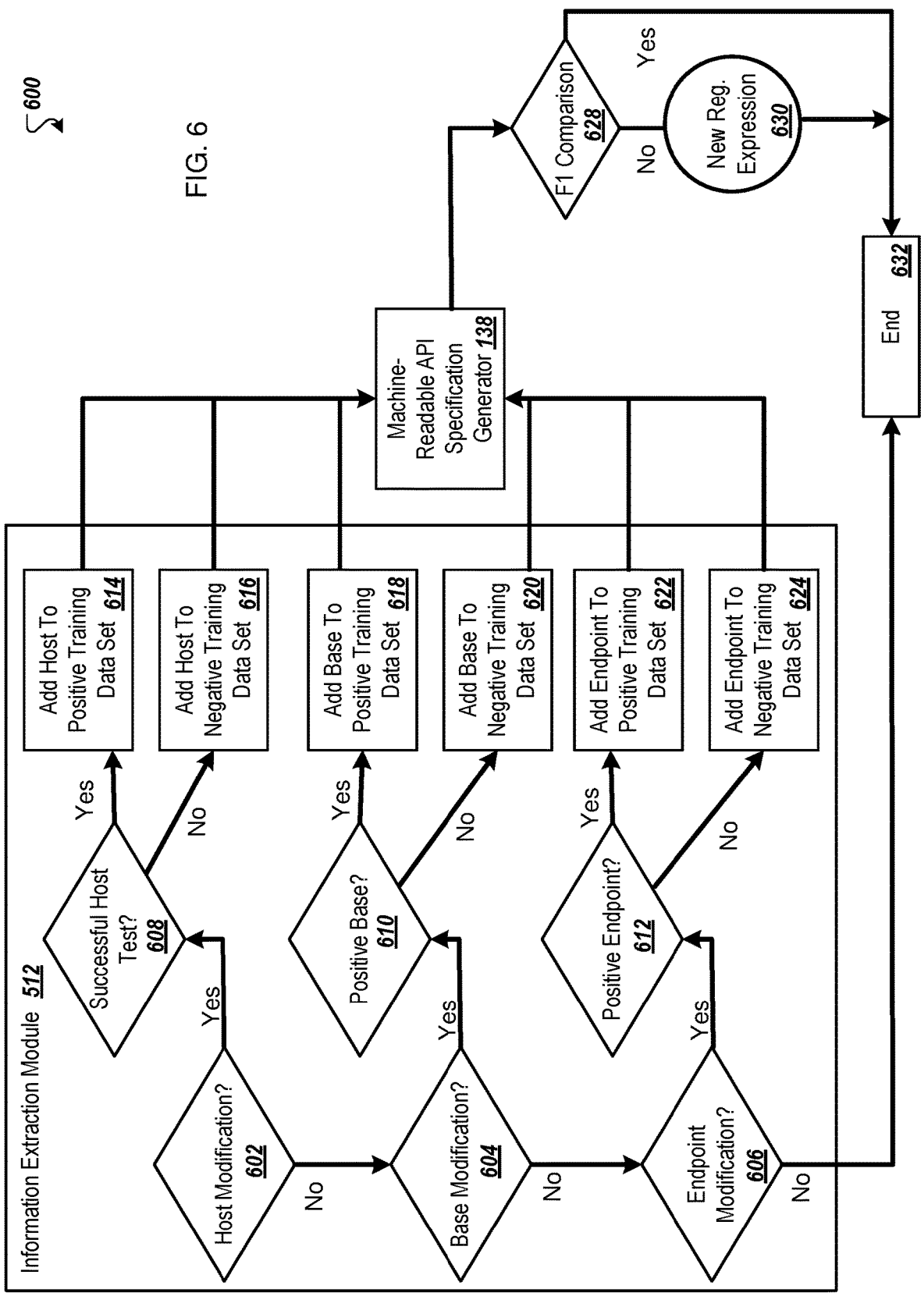
FIG. 6 illustrates an example information extraction process that may be implemented in the response evaluation process of FIG. 5.

FIG. 6 illustrates an example embodiment of the IE module 512 that may be implemented in the feedback processor 206. The IE module 512 includes a series of determination modules (e.g., 602, 604, 606, 608, 610, and 612). Based on the series of determination modules, the training sets such as the training data 314 of FIG. 3 may be modified.

A first determination module 602, a second determination module 604, and a third determination module 606 may determine which part or attribute of a machine-readable API specification that is modified based on the response(s) (e.g., 513 of FIG. 5). The part or attribute modified based on the responses may correspond to an attribute that may be added to the training data.

For example, with combined reference to FIGS. 5 and 6, in first determination module 528 of FIG. 5, it may be determined that the host URL does not exist in the API learning system 110. Accordingly, at the first determination module 602 in FIG. 6, it may be determined whether the host URL, which does not exist in the API learning system 110, is an attribute that is modified. If so, additional determinations may be performed in a fourth determination module 608, which is described below.

Similarly, in first determination module 528 of FIG. 5, it may be determined that the host URL exists in the API learning system 110. However, at the second determination module 526 it may be determined that the base-URI does not exist in the API learning system 110. Accordingly, at the first determination module 602 in FIG. 6, it may be determined that the host URL is not modified based on the response. Thus, at the second determination module 604 of FIG. 6, it may be determined whether the base-URI, which does not exist in the API learning system 110, is an attribute that is modified. If so, additional determinations may be performed in a fifth determination module 610, which is described below.

Similarly still, in first determination module 528 and the second determination module 526 of FIG. 5, it may be determined that the host URL and the base-URI exist in the API learning system 110. However, at the third determination module 524, it may be determined that the endpoint does not exist in the API learning system 110. Accordingly, at the first determination module 602 and the second determination module 604 in FIG. 6, it may be determined that the host URL and the base-URI are not modified based on the response. Thus, at the third determination module 606 of FIG. 6, it may be determined whether the endpoint, which does not exist in the API learning system 110, is an attribute that is modified. If so, additional determinations may be performed in a sixth determination module 612, which is described below. Otherwise, the information extraction process 600 of FIG. 6 may end at block 632.

Referring to FIG. 6, the fourth determination module 608, the fifth determination module 610, and the sixth determination module 612 may determine whether the response included a positive case or a negative case. In particular, the fourth determination module 608 determines whether a positive case is included in a response that is returned when the host is the attribute that is modified. The fifth determination module 610 determines whether a positive case is included in a response that is returned when the base-URI is the attribute that is modified. The sixth determination module 612 determines whether a positive case is included in a response that is returned when the endpoint is the attribute that is modified.

The IE module 512 includes addition modules 614, 616, 618, 620, 622, and 624 (collectively, addition modules). The addition modules add cases to test data (e.g., 314) based on determinations made in the fourth determination module 608, the fifth determination module 610, and the sixth determination module 612. The addition modules include negative case addition modules 616, 620, and 624 and positive case addition modules 614, 618, and 622. The negative case addition modules 616, 620, and 624 add a negative test case to the test data responsive to the determinations in the fourth determination module 608, the fifth determination module 610, and the sixth determination module 612 that the response includes a negative case. The positive case addition modules 614, 618, and 622 add a positive test case to the test data responsive to the determinations in the fourth determination module 608, the fifth determination module 610, and the sixth determination module 612 that the response includes a positive case.

The API generator 138 may generate a new machine-readable API specification based on test data that includes the additions described above. At a F1 comparison module 628, the F1 score of the new machine-readable API specification may be compared to an F1 score of a previous machine-readable API specification. In response to the F1 score of the new machine-readable API specification being less than or equal to the F1 score of the previous machine-readable API specification, the information extraction module 512 may expand the new machine-readable API specification until there is an increase in the F1 score. Additionally, the new machine-readable API specification may be reduced until the F1 score does not decrease. The expanded new machine-readable API specification may be input to the evaluation module 132 as new reg. expression 630. Otherwise, the test-assisted API learning process may proceed without specific feedback regarding the endpoints of the endpoints and responses 513.

Figure 7:
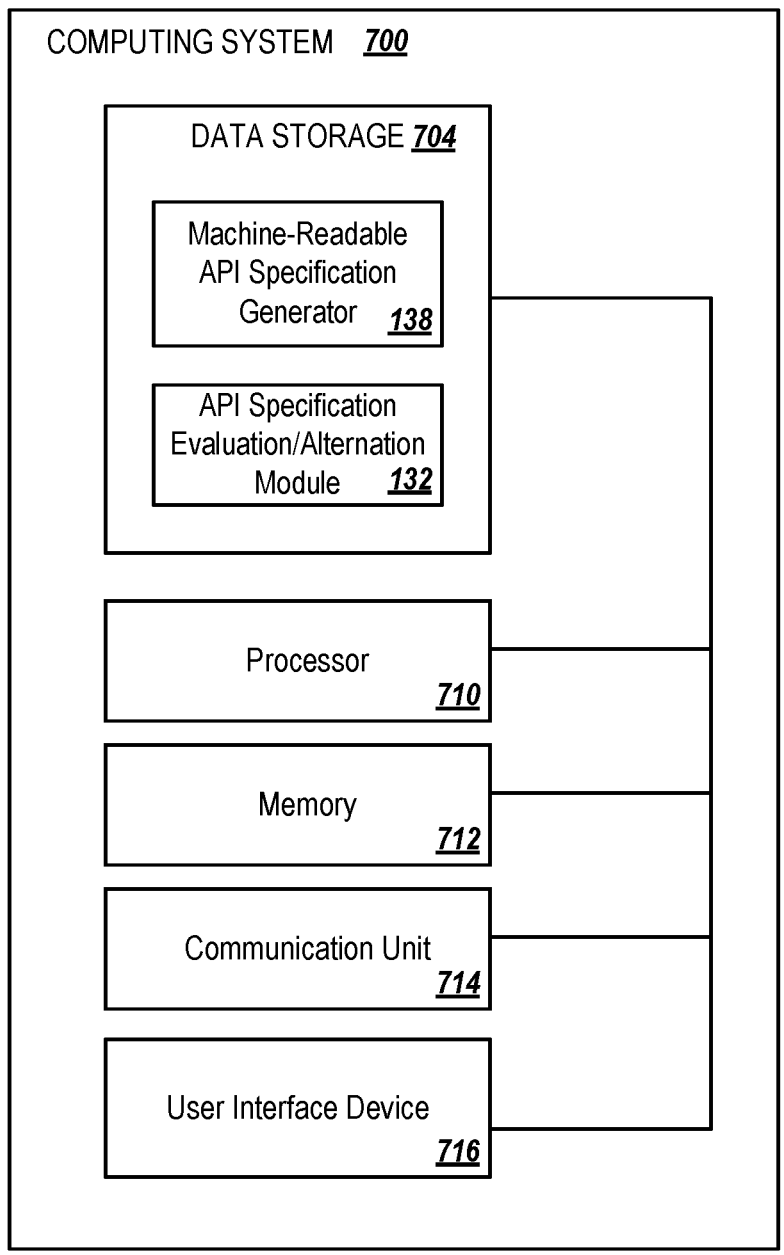
FIG. 7 is a block diagram of an example computing system that is configured for test-assisted API learning.

FIG. 7 illustrates an example computing system 700 configured for test-assisted API learning according to at least one embodiment of the present disclosure. The computing system 700 may be implemented in the operating environment 100 of FIG. 1, for instance. Examples of the computing system 700 may include the API learning system 110, the native API system 130, the API document sources 115, or some combination thereof. The computing system 700 may include one or more processors 710, a memory 712, a communication unit 714, the user interface device 716, and a data storage 704 that includes the API generator 138 and the evaluation module 132 (collectively, modules 138/132).

The processor 710 may include any suitable special-purpose or general-purpose computer, computing entity, or processing device including various computer hardware or software modules and may be configured to execute instructions stored on any applicable computer-readable storage media. For example, the processor 710 may include a microprocessor, a microcontroller, a digital signal processor (DSP), an ASIC, an FPGA, or any other digital or analog circuitry configured to interpret and/or to execute program instructions and/or to process data.

Although illustrated as a single processor in FIG. 7, the processor 710 may more generally include any number of processors configured to perform individually or collectively any number of operations described in the present disclosure. Additionally, one or more of the processors 710 may be present on one or more different electronic devices or computing systems. In some embodiments, the processor 710 may interpret and/or execute program instructions and/or process data stored in the memory 712, the data storage 704, or the memory 712 and the data storage 704. In some embodiments, the processor 710 may fetch program instructions from the data storage 704 and load the program instructions in the memory 712. After the program instructions are loaded into the memory 712, the processor 710 may execute the program instructions.

The memory 712 and the data storage 704 may include computer-readable storage media for carrying or having computer-executable instructions or data structures stored thereon. Such computer-readable storage media may include any available media that may be accessed by a general-purpose or special-purpose computer, such as the processor 710. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 710 to perform a certain operation or group of operations.

The communication unit 714 may include one or more pieces of hardware configured to receive and send communications. In some embodiments, the communication unit 714 may include one or more of an antenna, a wired port, and modulation/demodulation hardware, among other communication hardware devices. In particular, the communication unit 714 may be configured to receive a communication from outside the computing system 700 and to present the communication to the processor 710 or to send a communication from the processor 710 to another device or network (e.g., 124 of FIG. 1).

The user interface device 716 may include one or more pieces of hardware configured to receive input from and/or provide output to a user. In some embodiments, the user interface device 716 may include one or more of a speaker, a microphone, a display, a keyboard, a touch screen, or a holographic projection, among other hardware devices.

The modules 138/132 may include program instructions stored in the data storage 704. The processor 710 may be configured to load the modules 138/132 into the memory 712 and execute the modules 138/132. Alternatively, the processor 710 may execute the modules 138/132 line-by-line from the data storage 704 without loading them into the memory 712. When executing the modules 138/132, the processor 710 may be configured to perform a participation verification process as described elsewhere in this disclosure.

Modifications, additions, or omissions may be made to the computing system 700 without departing from the scope of the present disclosure. For example, in some embodiments, the computing system 700 may not include the user interface device 716. In some embodiments, the different components of the computing system 700 may be physically separate and may be communicatively coupled via any suitable mechanism. For example, the data storage 704 may be part of a storage device that is separate from a server, which includes the processor 710, the memory 712, and the communication unit 714, that is communicatively coupled to the storage device. The embodiments described herein may include the use of a special-purpose or general-purpose computer including various computer hardware or software modules, as discussed in greater detail below.

Figure 8A:
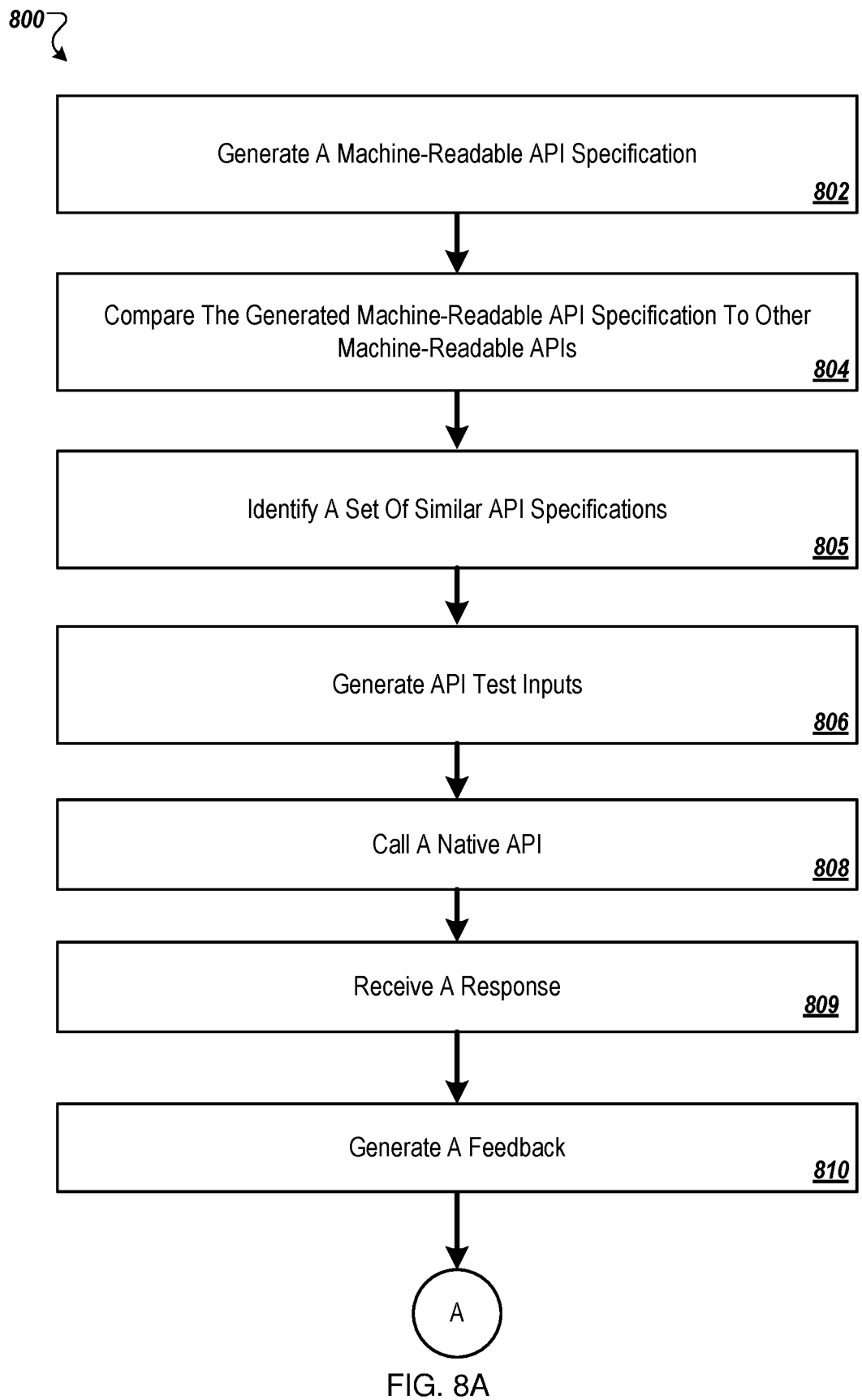
FIGS. 8A and 8B are a flow diagram of an example method of test-assisted API learning that may be implemented in the operating environment of FIG. 1.
Figure 8B:
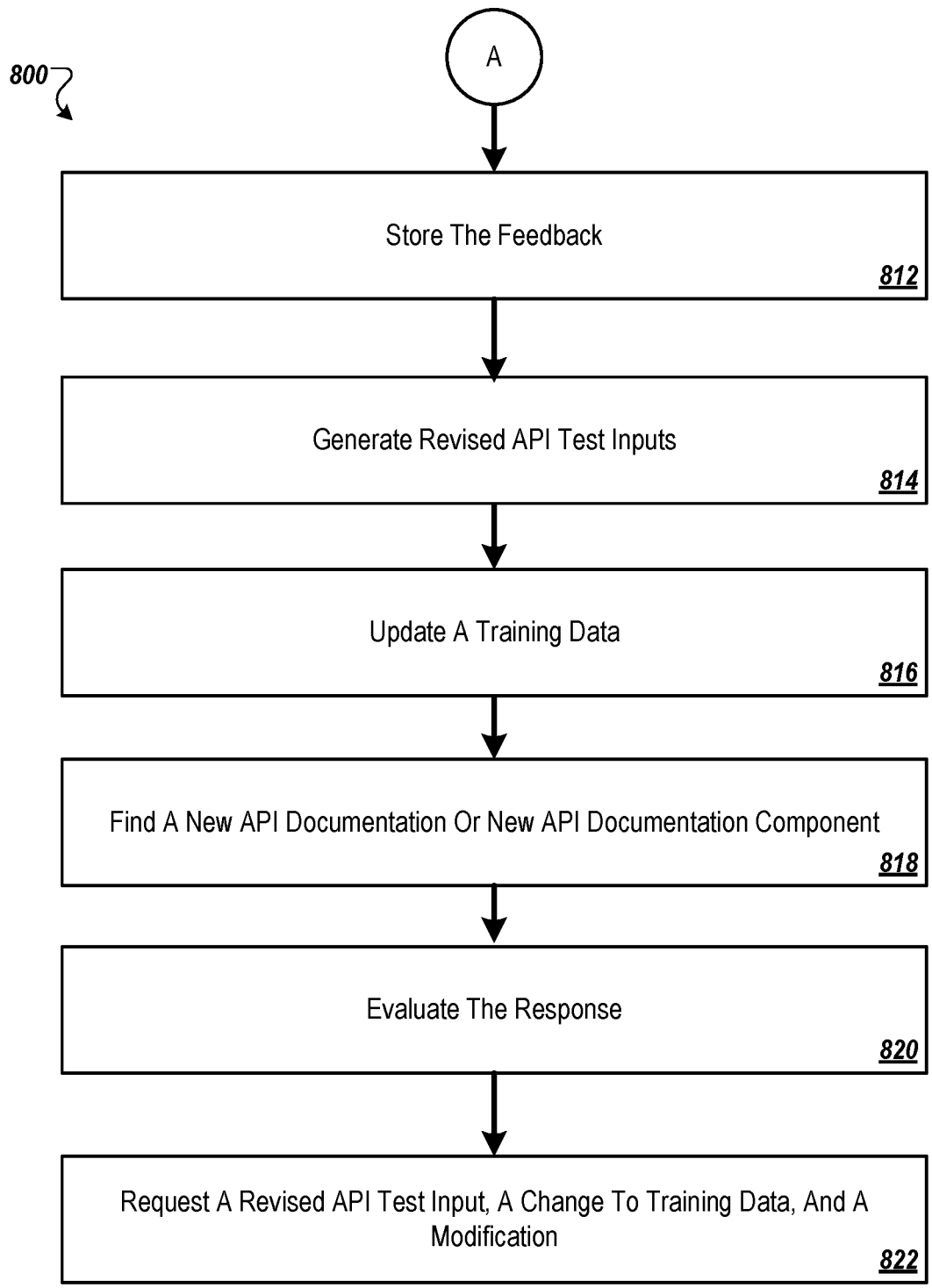

FIGS. 8A and 8B is a flow chart of an example method 800 of test-assisted API learning, according to at least one embodiment described in the present disclosure. Although illustrated as discrete blocks, various blocks in FIGS. 8A and 8B may be divided into additional blocks, combined into fewer blocks, or eliminated, depending on the desired implementation.

With reference to FIG. 8A, the method 800 may begin at block 802 in which a machine-readable API specification may be generated. The machine-readable API specification may be generated based on application of a machine learning process and/or a regular expression process to an API documentation. At block 804, the generated machine-readable API specification may be compared to other machine-readable API specifications. At block 805, a set of similar API specifications may be identified. The set of similar API specifications may be identified based on a comparison between the generated machine-readable API specification and the other machine-readable API specifications. The other machine-readable API specifications may be accessed from an API learning repository. At block 806, API test inputs may be generated. The API test inputs may include API endpoints that may be based on the set of similar API specifications and the generated machine-readable API specification.

At block 808, a native API system may be called. The native API system may be called using one or more of the generated API test inputs. At block 809, a response may be received. The response may be received from the native API system. The response may be indicative of whether a first API test input successfully interacts with the native API system.

At block 810, feedback may be generated. The feedback may be generated based on the response from the native API system. The feedback is indicative of an alteration to one or more or a combination of the machine learning process, the regular expression process, and the API test inputs.

Referring to FIG. 8B, at block 812, the feedback may be stored. The feedback may be stored for each of the generated API endpoints. In some embodiments, the storing includes identifying successful API endpoints and one or more updates to the machine-readable API specification that resulted in a successful correct information extraction from the native API system. At block 814, revised API test inputs may be generated. The revised API test inputs may be based on the feedback. The revised API test inputs may include at least one modification to the first API test input or another of the API test inputs that may reflect the response. At block 816, a training data may be updated. The training data may be updated based on the response from the native API system. At block 818, a new API documentation or component thereof may be found based on the response. At block 820, the response may be evaluated based on standard response codes. At block 822, one or more or a combination of a revised API test input, a change to training data, and a modification to the initial regular expression may be requested. The revised API test input, the change to training data, and the modification to the initial regular expression may be requested based on the evaluated response.

Figure 9:
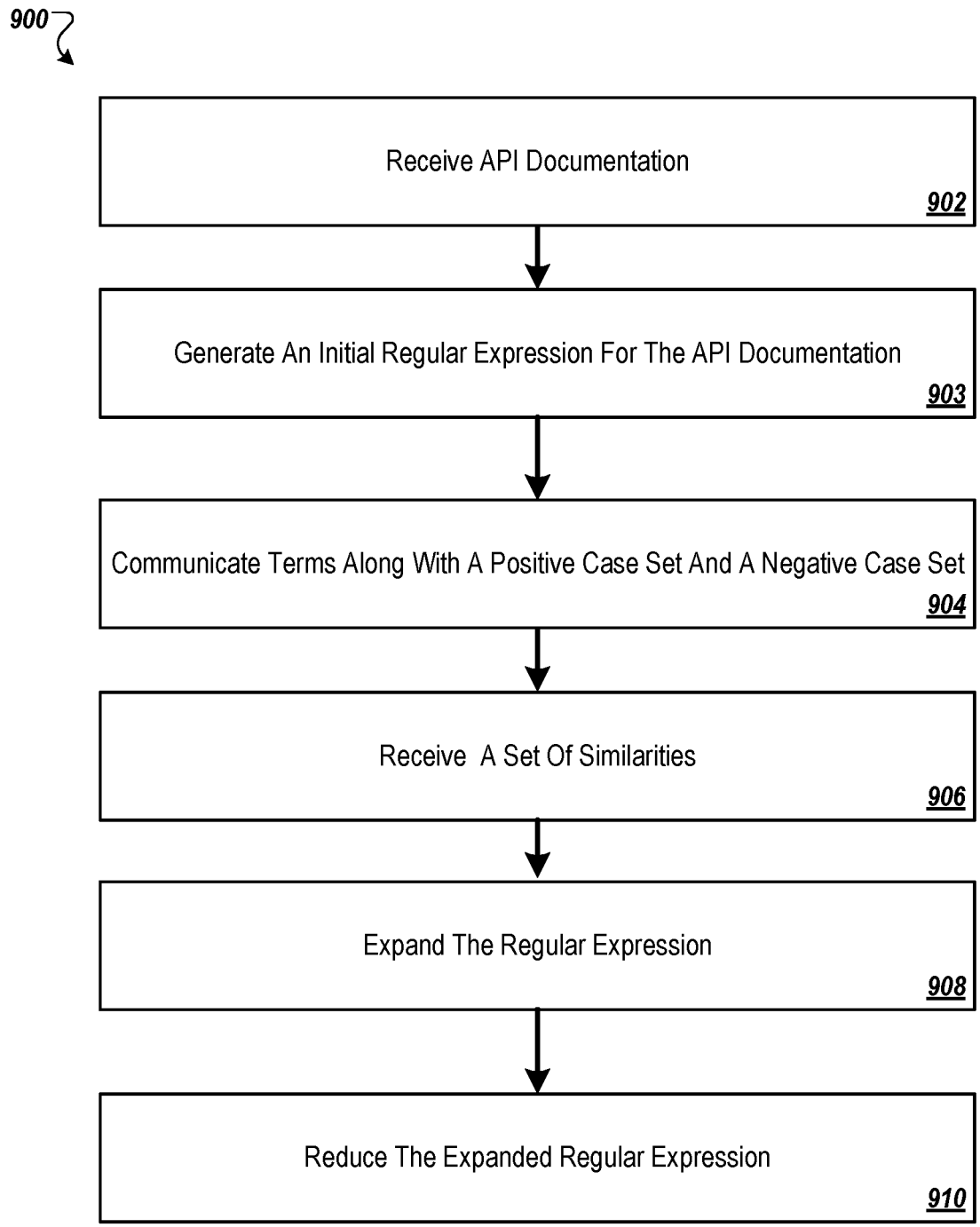
FIG. 9 is a flow diagram of an example method of a machine learning process that may be implemented in the operating environment of FIG. 1.

FIG. 9 is a flow chart of an example method 900 of machine learning, according to at least one embodiment described in the present disclosure. Although illustrated as discrete blocks, various blocks in FIG. 9 may be divided into additional blocks, combined into fewer blocks, or eliminated, depending on the desired implementation. In some embodiments, the method 900 may be implemented in a step in another method. For example, the method 900 may be implemented as the machine learning process of block 802 of the method 800.

The method 900 may begin at block 902 in which an initial regular expression may be received. The initial regular expression may relate to a particular task. At block 903, an initial regular expression may be generated for the API documentation. At block 904, terms in the initial regular expression may be communicated to a similarity analysis program along with a positive case set and a negative case set for the initial regular expression. In some embodiments, the similarity analysis program includes a word embedding tool or a similar application or program. At block 906, a set of similarities may be received. The set of similarities may be received from the similarity analysis program. The set of similarities may include similarities of the terms, similarities of the positive case set, and similarities of the negative case set.

At block 908, the regular expression may be expanded. The regular expression may be expanded based on training data and the set of similarities. The regular expression may be expanded to accept more cases until there is an increase in a harmonic mean of a precision and a recall (F1 score) of an expanded regular expression. In some embodiments, the expanding the regular expression includes expanding the regular expression to accept all possible positive cases. At block 910, the expanded regular expression may be reduced. The expanded regular expression may be reduced until the F1 score does not decrease. In some embodiments, the expanded regular expression is reduced to maximize a positive acceptance rate and to reduce a negative acceptance rate.

Figure 10:
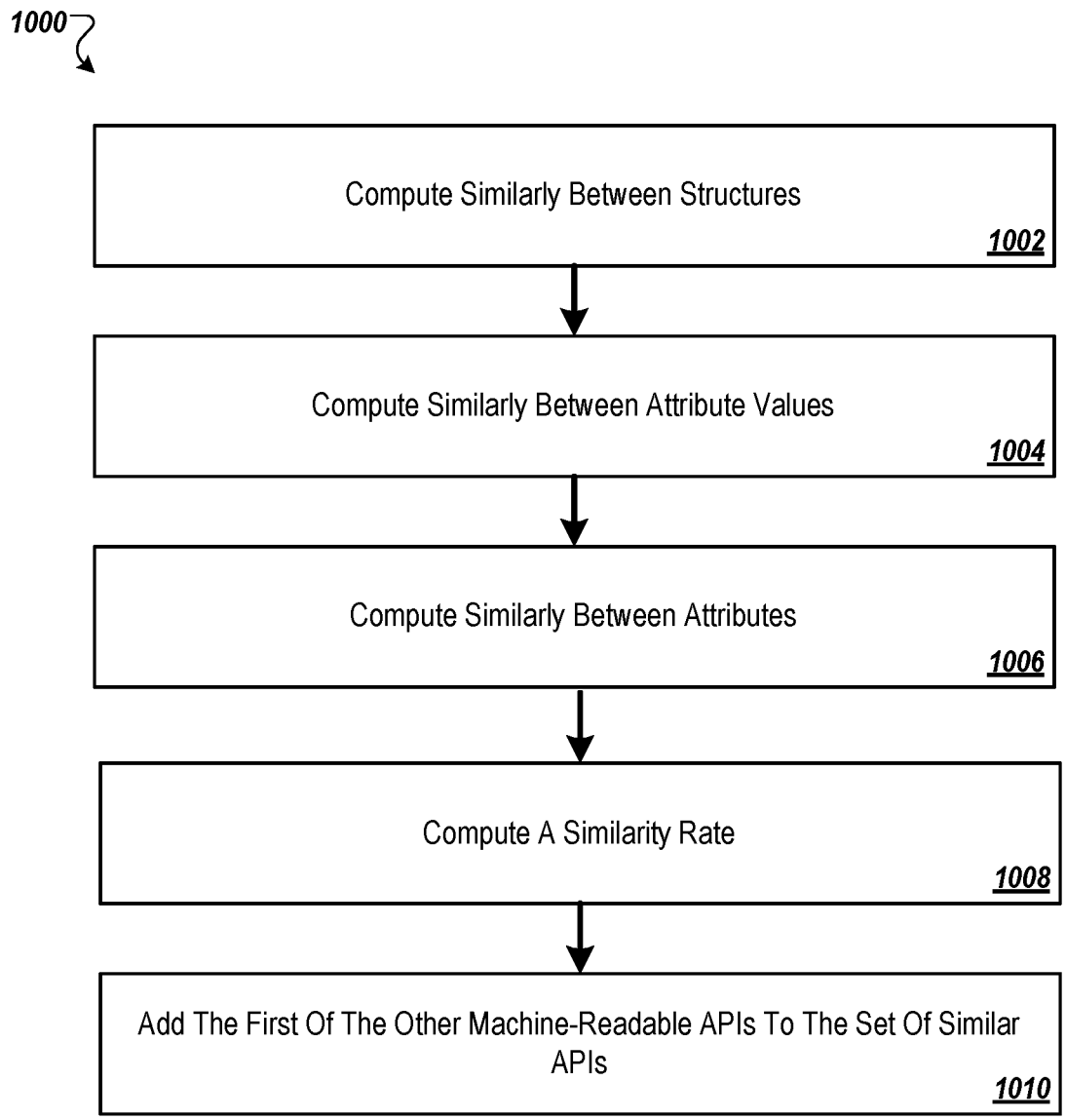
FIG. 10 is a flow diagram of an example method of a API similarity analysis that may be implemented in the operating environment of FIG. 1, all according to at least one embodiment described in the present disclosure.

FIG. 10 is a flow chart of an example method 1000 for identifying a set of similar API specifications, according to at least one embodiment described in the present disclosure. Although illustrated as discrete blocks, various blocks in FIG. 10 may be divided into additional blocks, combined into fewer blocks, or eliminated, depending on the desired implementation. In some embodiments, the method 1000 may be implemented in a step in another method. For example, the method 1000 may be implemented as block 805 of the method 800.

The method 1000 may begin at block 1002 in which similarly between structures are computed. For example, similarity between structures of the machine-readable API specification and a first of the other machine-readable API specifications may be computed. At block 1004, similarly between attribute values may be computed. For example, similarly between attribute values of the machine-readable API specification and the first of the other machine-readable API specifications may be computed. At block 1006, similarly between attributes may be computed. For example, similarly between attributes of the machine-readable API specification and the first of the other machine-readable API specifications may be computed.

At block 1008, a similarity rate may be calculated. The similarity rate may be calculated based on the computed similarities between the structures, the attributes, and the attribute values. At block 1010, the first of the other machine-readable API specifications may be added to the set of similar APIs. The first of the other machine-readable API specifications may be added in response to the similarity rate of the computed similarities being greater than a particular threshold.

The methods 800, 900, and 1000 may be performed in an operating environment such as the operating environment 100 of FIG. 1. The methods 800, 900, and 1000 may be programmably performed in some embodiments by the API learning system 110 described with reference to FIG. 1. In some embodiments, the API learning system 110 or another computing system may include or may be communicatively coupled to a non-transitory computer-readable medium (e.g., the memory 712 of FIG. 7) having stored thereon programming code or instructions that are executable by one or more processors (such as the processor 710 of FIG. 7) to cause a computing system and/or the API learning system 110 to perform or control performance of the methods 800, 900, and 1000. Additionally or alternatively, the API learning system 110 may include the processor 710 described elsewhere in this disclosure that is configured to execute computer instructions to cause the API learning system 110 or another computing system to perform or control performance of the methods 800, 900, and 1000.

The embodiments described herein may include the use of a special purpose or general purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data, which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of test-assisted application programming interface (API) learning, the method comprising:
    generating a machine-readable API specification based on application of a machine learning process and a regular expression process to an API documentation;
    comparing the generated machine-readable API specification to other machine-readable API specifications;
    computing similarity rates for each API specification of the other machine-readable API specifications, the similarity rate being based on computed similarities of structures, attributes, and attribute values of the machine-readable API specification and each API specification;

in response to the computed similarity rate for each API specification being greater than a particular threshold, adding the API specification to a set of similar API specifications;

generating API test inputs that include API endpoints based on the set of similar API specifications and the generated machine-readable API specification;

calling a native API system using a first API test input of the generated API test inputs;

receiving a response from the native API system, the response being indicative of whether the first API test input successfully interacts with the native API system; and based on the response from the native API system, generating a feedback that is indicative of an alteration to one or more or a combination of the machine learning process, the regular expression process, and the API test inputs.

2. The method of claim 1, further comprising storing the feedback for the generated API test inputs, wherein the storing includes identifying a successful API endpoint and an update to the machine-readable API specification that resulted in a successful interaction with the native API system.

3. The method of claim 1, further comprising generating a revised API test input based on the feedback, wherein the revised API test input includes at least one modification to the first API test input that reflects the response from the native API system.

4. The method of claim 1, further comprising:
updating a training data based on the response; and
finding a new API documentation or component thereof based on the response.

5. The method of claim 1, further comprising evaluating the response based on standard response codes, wherein the alteration includes a one or more or a combination of a revised API test input, a change to training data, and a modification to an initial regular expression of the regular expression process.

6. The method of claim 1, wherein the machine learning process includes:
receiving the API documentation from an API document source, wherein the API documentation relates to a particular task;
generating an initial regular expression for the API documentation;
communicating terms in the initial regular expression to a similarity analysis program along with a positive case set and a negative case set;
receiving from the similarity analysis program a set of similarities, the set of similarities including similarities of terms, similarities of the positive case set, and similarities of the negative case set;
based on training data and the set of similarities, expanding the regular expression to accept more cases until there is an increase in a harmonic mean of a precision and a sensitivity (F1 score) of an expanded regular expression; and
reducing the expanded regular expression until the F1 score does not decrease.

7. The method of claim 6, wherein the similarity analysis program includes a word embedding tool.

8. The method of claim 6, wherein the expanding the initial regular expression includes expanding the initial regular expression to accept all possible positive cases.

9. The method of claim 6, wherein the expanded regular expression is reduced to maximize a positive acceptance rate and to reduce a negative acceptance rate.

10. The method of claim 1, wherein the other machine-readable API specifications are accessed from an API repository.

11. A non-transitory computer-readable medium having encoded therein programming code executable by one or more processors to perform or control performance of operations comprising:
generating a machine-readable API specification based on application of a machine learning process and a regular expression process to an API documentation;
comparing the generated machine-readable API specification to other machine-readable API specifications;
computing similarity rates for each API specification of the other machine-readable API specifications, the similarity rate being based on computed similarities of structures, attributes, and attribute values of the machine-readable API specification and each API specification;
in response to the computed similarity rate for each API specification being greater than a particular threshold, adding the API specification to a set of similar API specifications;
generating API test inputs that include API endpoints based on the set of similar API specifications and the generated machine-readable API specification;
calling a native API system using a first API test input of the generated API test inputs;
receiving a response from the native API system, the response being indicative of whether the first API test input successfully interacts with the native API system; and
based on the response from the native API system, generating a feedback that is indicative of an alteration to one or more or a combination of the machine learning process, the regular expression process, and the API test inputs.

12. The non-transitory computer-readable medium of claim 11, wherein:
the operations further comprise storing the feedback for the generated API test inputs; and
the storing includes identifying a successful API endpoint and an update to the machine-readable API specification that resulted in a successful interaction with the native API system.

13. The non-transitory computer-readable medium of claim 11, wherein:
the operations further comprise generating a revised API test input based on the feedback; and
the revised API test input includes at least one modification to the first API test input that reflects the response from the native API system.

14. The non-transitory computer-readable medium of claim 11, wherein the operations further comprise:
updating a training data based on the response; and
finding a new API documentation or component thereof based on the response.

15. The non-transitory computer-readable medium of claim 11, wherein:
the operations further comprise evaluating the response based on standard response codes; and
the alteration includes a one or more or a combination of a revised API test input, a change to training data, and a modification to an initial regular expression of the regular expression process.

16. The non-transitory computer-readable medium of claim 11, wherein the machine learning process includes:
receiving the API documentation from an API document source, wherein the API documentation relates to a particular task;
generating an initial regular expression for the API documentation;
communicating terms in the initial regular expression to a similarity analysis program along with a positive case set and a negative case set;
receiving from the similarity analysis program a set of similarities, the set of similarities including similarities of terms, similarities of the positive case set, and similarities of the negative case set;
based on training data and the set of similarities, expanding the regular expression to accept more cases until there is an increase in a harmonic mean of a precision and a sensitivity (F1 score) of an expanded regular expression; and
reducing the expanded regular expression until the F1 score does not decrease.

17. The non-transitory computer-readable medium of claim 16, wherein the similarity analysis program includes a word embedding tool.

18. The non-transitory computer-readable medium of claim 16, wherein the expanding the initial regular expression includes expanding the initial regular expression to accept all possible positive cases.

19. The non-transitory computer-readable medium of claim 16, wherein the expanded regular expression is reduced to maximize a positive acceptance rate and to reduce a negative acceptance rate.

20. The non-transitory computer-readable medium of claim 11, wherein the other machine-readable API specifications are accessed from an API repository.

* * * * *